(12) United States Patent
Farley et al.

(10) Patent No.: US 10,440,888 B2
(45) Date of Patent: Oct. 15, 2019

(54) DRAPER BELT SYSTEM WITH DISTANCE CHANGE OF PIVOTING ROLLER

(71) Applicant: CNH Industrial America, LLC, New Holland, PA (US)

(72) Inventors: Herb M. Farley, Elizabethtown, PA (US); Benjamin Kemmerer, Hamburg, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/639,251

(22) Filed: Jun. 30, 2017

(65) Prior Publication Data

US 2019/0000014 A1    Jan. 3, 2019

(51) Int. Cl.
*A01D 61/02* (2006.01)
*A01D 61/00* (2006.01)
*A01D 41/14* (2006.01)

(52) U.S. Cl.
CPC ............. *A01D 61/02* (2013.01); *A01D 41/14* (2013.01); *A01D 41/144* (2013.01); *A01D 61/002* (2013.01)

(58) Field of Classification Search
CPC ...... A01D 61/02; A01D 61/002; A01D 57/20; A01D 41/14; A01D 41/144
See application file for complete search history.

(56) References Cited

U.S. PATENT DOCUMENTS

| | | | |
|---|---|---|---|
| 6,675,568 B2 | 1/2004 | Patterson et al. | |
| 7,614,206 B2 | 11/2009 | Tippery et al. | |
| 7,802,417 B2 * | 9/2010 | Sauerwein | A01D 41/14 56/181 |
| 8,087,224 B1 | 1/2012 | Coers et al. | |
| 8,281,561 B2 * | 10/2012 | Dow | A01D 57/20 56/181 |
| 9,402,343 B1 * | 8/2016 | Allochis | A01D 34/283 |
| 9,526,210 B2 * | 12/2016 | Schulze Selting | A01D 41/12 |
| 9,622,409 B2 * | 4/2017 | Coers | A01D 41/14 |
| 2007/0251202 A1 * | 11/2007 | Coers | A01D 57/20 56/181 |
| 2008/0295472 A1 | 12/2008 | Tippery | |
| 2008/0295473 A1 * | 12/2008 | Tippery | A01D 41/144 56/14.5 |
| 2009/0320431 A1 * | 12/2009 | Puryk | A01D 41/14 56/181 |

(Continued)

FOREIGN PATENT DOCUMENTS

WO    2015139970    9/2015

OTHER PUBLICATIONS

Extended European Search Report for EPC Application No. 18180492.3 dated Nov. 28, 2018 (6 pages).

*Primary Examiner* — Arpad Fabian-Kovacs
(74) *Attorney, Agent, or Firm* — Peter K. Zacharias; Patrick M. Sheldrake (57) ABSTRACT

A draper belt system is provided that includes a first draper belt assembly with first and second rollers, and a second draper belt assembly with third and fourth rollers. The third roller of the second draper belt assembly is disposed adjacent to the first roller of the first draper belt assembly. The first draper belt assembly is configured to pivot relative to the second draper belt assembly. Pivoting of the first draper belt assembly results in a change in a distance between the first and third rollers.

20 Claims, 11 Drawing Sheets (56) References Cited

U.S. PATENT DOCUMENTS

| | | | |
|---|---|---|---|
| 2011/0099964 A1* | 5/2011 | Coers | A01D 41/14 56/296 |
| 2013/0105282 A1* | 5/2013 | Hoffman | A01D 41/14 198/814 |
| 2014/0075907 A1* | 3/2014 | Ritter | A01D 45/021 56/105 |
| 2015/0059307 A1* | 3/2015 | Ritter | A01D 75/182 56/6 |

* cited by examiner

DRAPER BELT SYSTEM WITH DISTANCE CHANGE OF PIVOTING ROLLER

BACKGROUND

Harvesters are used in the agricultural industry to harvest a variety of crops. Headers for harvesters generally use belts on rollers to move the harvested crops from lateral areas of the header to a central area for processing. As demand for larger harvesters with increased capacity increases, the harvester must either drive the belts faster or the headers must be wider to accommodate more crop. There are many challenges associated with driving the belt faster, including the increased wear of parts, power costs, and maintenance costs.

In order to make a header wider while still adhering to changes in terrain, the header must be flexible. Generally, such flexibility is accomplished by the use of two or more belt and roller assemblies, and a pivot joint of the draper frame between the two assemblies. The pivot joint is generally positioned between the two belt and roller assemblies, resulting in a gap between the rollers through which crop can be lost during harvesting.

Figure 1:
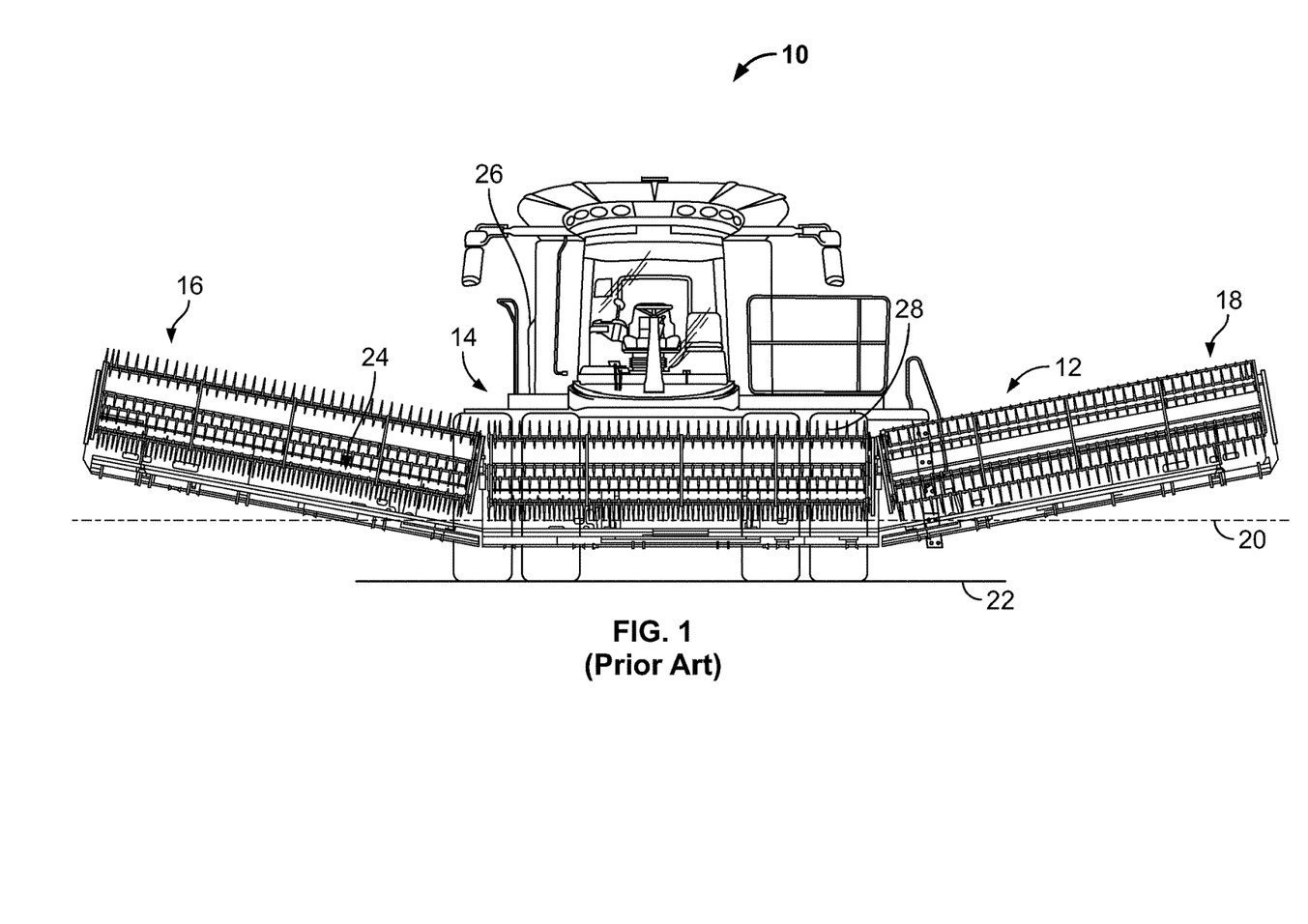
FIG. 1 is a front view of a traditional harvester including a header.

For example, FIG. 1 shows a front view of a traditional harvester 10. The harvester 10 includes a header 12, such as the one described in U.S. Pat. No. 8,087,224 ("the '224 Patent"). The header 12 can include a central section 14 with right and left wings 16, 18 capable of pivoting relative to the central section 14 to accommodate uneven terrain while providing the wide header 12 for greater crop capacity. A lateral plane 20 extends through the header 12 and can generally be substantially parallel to the ground 22 during normal use. The header 12 includes a draper belt system 24 disposed in the central section 14 and the right and left wings 16, 18 to assist in guiding crop from the header 12 into a processing system 26 within the harvester 10. The central section 14 and the right and left wings 16, 18 can include reels 28.

Figure 2:
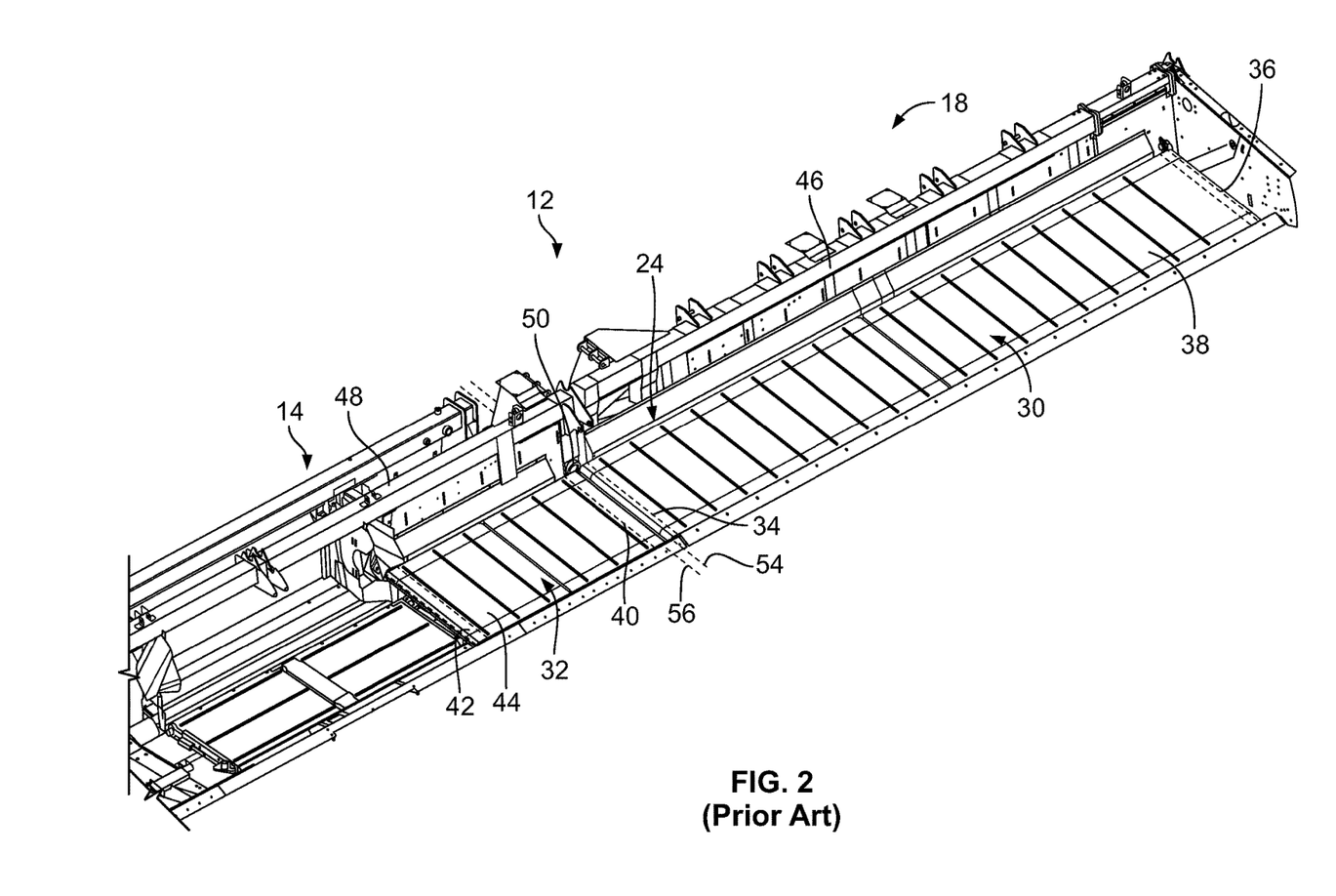
FIG. 2 is a perspective, partial view of a traditional harvester header.
Figure 3:
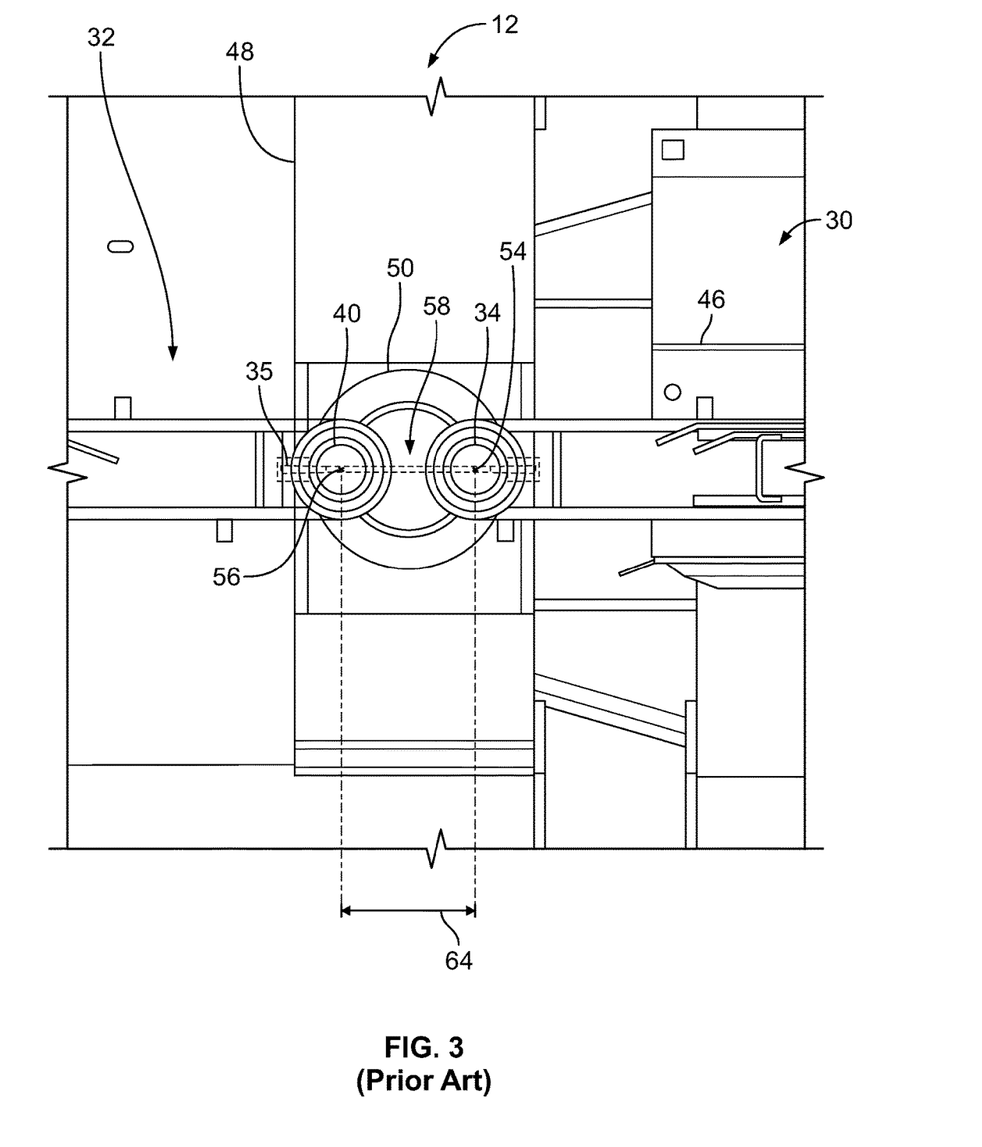
FIG. 3 is a detailed front view of a traditional harvester header.

FIGS. 2 and 3 show perspective and detailed views of the header 12. Although discussed with respect to the left wing 18, it should be understood that the right wing 16 has a similar structure and function. The header 12 includes a draper belt system 24 for transferring harvested crop from the left wing 18 to the central section 14 such that the central section 14 can introduce the crop into the processing system 26. The draper belt system 24 includes a first draper belt assembly 30 at the left wing 18 and a second draper belt assembly 32 at the central section 14 disposed adjacent to the first draper belt assembly 30.

The first draper belt assembly 30 includes a first roller 34, a second roller 36, and a belt 38 looped around the first and second rollers 34, 36. The second draper belt assembly 32 includes a third roller 40, a fourth roller 42, and a belt 44 looped around the third and fourth rollers 40, 42. As the belt 38 is rotated in a counterclockwise direction, crop collected on the belt 38 is transferred from the left wing 18 to the belt 44 of the central section 14. The header 12 includes a draper frame 46 associated with the left wing 18 and a draper frame 48 associated with the central section 14. The draper frames 46, 48 connect at a pivot joint 50 such that the left wing 18 can rotate relative to the central section 14.

The first roller 34 and the third roller 40 each have their own central longitudinal axis 54, 56 about which the respective first roller 34 and third roller 40 rotate. As shown in the detailed view of FIG. 3, due to the separate belt assemblies 30, 32, the first and third rollers 34, 40 are separated by a gap 58 to allow for rotation of the draper frame 46 relative to the draper frame 48 without interference between the belts 38, 44. The gap 58 results in the axes 54, 56 being separated by a distance 64, which the '224 Patent describes is constant. Although not clear or described in the '224 Patent, it appears that the distance 64 is kept constant by a frame 35 surrounding the rollers 34, 40, which locks the spacing between the axes 54, 56. Such a frame 35 can be difficult to construct, can require additional maintenance of parts, increases the cost of production, and can increase the time necessary for replacement of parts.

SUMMARY

Exemplary embodiments are directed to a draper belt system for a harvester header including first and second draper belt assemblies (e.g., wing and fixed draper belt assemblies, respectively). The first and second draper belt assemblies each include a pair of rollers and a draper belt. The first and second draper belt assemblies are positioned substantially adjacent to each other. A pivot joint in the draper frame allows the first draper belt assembly to pivot relative to the second draper belt assembly. Pivoting the first draper belt assembly results in a change in a distance as measured between either the adjacently disposed belts and/or rollers (e.g., a non-constant distance between the first and second draper belt assemblies during the pivoting operation). This configuration advantageously maintains a substantially constant tension on the cutter bar of the harvester, reducing changes in tension and/or compression of the cutter bar during pivoting of the wing draper belt assembly.

In accordance with embodiments of the present disclosure, an exemplary draper belt system is provided. The draper belt system includes a first draper belt and a second draper belt assembly. The first draper belt assembly includes a first roller, a second roller, and one or a plurality of draper belts looped around the first and second rollers. The first roller defines a first central longitudinal axis about which the first roller spins, and a first plane extending through the first central longitudinal axis and parallel or substantially parallel to horizontal. The second draper belt assembly includes a third roller, a fourth roller, and one or a plurality of draper belts looped around the third and fourth rollers. The third roller defines a second central longitudinal axis about which the third roller spins, and a second plane extending through the second central longitudinal axis and parallel or substantially parallel to horizontal. The third roller of the second draper belt assembly is disposed adjacent to or substantially adjacent to the first roller of the first draper belt assembly with the first plane aligned or substantially aligned with the second plane. The first draper belt assembly is configured to pivot relative to the second draper belt assembly. Pivoting of the first draper belt assembly results in a change in a distance between the first and third rollers.

Pivoting of the first draper belt assembly results in a change in a distance between the first and second central longitudinal axes. In some embodiments, the first and third rollers can be of a substantially equal diameter. The first central longitudinal axis can extend parallel or substantially parallel to the second central longitudinal axis. The second draper belt assembly can define a fixed draper belt section of a harvester and the first draper belt assembly can define a pivoting wing draper belt section of the harvester.

The draper belt system includes a pivot joint disposed between the first and second draper belt assemblies. The pivot joint can define a central longitudinal pivot axis at which the first draper belt assembly pivots relative to the second draper belt assembly. The central longitudinal pivot axis can extend parallel or substantially parallel to the first and second central longitudinal axes. The central longitudinal pivot axis can extend through the first and second planes. The draper belt system can include a wing frame coupled to a distal end of the first draper belt assembly, and a central frame coupled to a distal end of the second draper belt assembly.

In accordance with embodiments of the present disclosure, an exemplary harvester header is provided. The harvester header includes a first draper belt assembly, a second draper belt assembly, and a central draper belt assembly. The first draper belt assembly includes a first roller, a second roller, and one or a plurality of draper belts looped around the first and second rollers. The first roller defines a first central longitudinal axis about which the first roller spins, and a first plane extending through the first central longitudinal axis and parallel or substantially parallel to horizontal. The second draper belt assembly includes a third roller, a fourth roller, and one or a plurality of draper belts looped around the third and fourth rollers. The third roller defines a second central longitudinal axis about which the third roller spins, and a second plane extending through the second central longitudinal axis and parallel or substantially parallel to horizontal. The central draper belt assembly includes a fifth roller, a sixth roller, and one or a plurality of belts looped around the fifth and sixth rollers. The third roller of the second draper belt assembly is disposed adjacent to or substantially adjacent to the first roller of the first draper belt assembly with the first plane aligned or substantially aligned with the second plane. The first draper belt assembly is configured to pivot relative to the second draper belt assembly. Pivoting of the first draper belt assembly results in a change in a distance between the first and third rollers.

The first draper belt assembly spins the one or plurality of belts on the first draper belt assembly in a first direction. The second draper belt assembly spins the one or plurality of belts in the first direction. The central draper belt assembly spins the one or plurality of belts in a second direction different from the first direction. In some embodiments, the second direction can be substantially perpendicular to the first direction. In some embodiments, the second direction can be at an angle relative to the first direction. In some embodiments, the angle can be between about 40° and about 85°. In some embodiments, the central draper belt assembly can define an infeed draper.

In accordance with embodiments of the present disclosure, an exemplary harvester is provided. The harvester includes a header including a first draper belt assembly, a second draper belt assembly, and a central draper belt assembly. The first draper belt assembly includes a first roller, a second roller, and one or a plurality of draper belts looped around the first and second rollers. The first roller defines a first central longitudinal axis about which the first roller spins, and a first plane extending through the first central longitudinal axis and parallel or substantially parallel to horizontal. The second draper belt assembly includes a third roller, a fourth roller, and one or a plurality of draper belts looped around the third and fourth rollers. The third roller defines a second central longitudinal axis about which the third roller spins, and a second plane extending through the second central longitudinal axis and parallel or substantially parallel to horizontal.

The central draper belt assembly includes a fifth roller, a sixth roller, and one or a plurality of belts looped around the fifth and sixth rollers. The third roller of the second draper belt assembly is disposed adjacent to or substantially adjacent to the first roller of the first draper belt assembly with the first plane aligned or substantially aligned with the second plane. The first draper belt assembly is configured to pivot relative to the second draper belt assembly. Pivoting of the first draper belt assembly results in a change in a distance between the first and third rollers. In some embodiments, the harvester can include an auger disposed adjacent or substantially adjacent to the first draper belt assembly, the second draper belt assembly, and the central draper belt assembly. The auger defines a third central longitudinal axis about which the auger spins. The harvester includes a processing system configured to process crop introduced into the processing system through the central draper belt assembly.

In some embodiments, the third central longitudinal axis can be oriented substantially perpendicularly to the first and second central longitudinal axes. The first draper belt assembly spins the one or plurality of belts on the first draper belt assembly in a first direction. The second draper belt assembly spins the one or plurality of belts in the first direction. The central draper belt assembly spins the one or plurality of belts in a second direction different from the first direction. In some embodiments, the second direction can be substantially perpendicular to the first direction.

In accordance with embodiments of the present disclosure, an exemplary method of operating a harvester is provided. The method includes spinning a first roller of a first draper belt assembly about a first central longitudinal axis. The first draper belt assembly includes a first roller, a second roller, and one or a plurality of draper belts looped around the first and second rollers. The first roller defines a first central longitudinal axis about which the first roller spins, and a first plane extending through the first central longitudinal axis and parallel or substantially parallel to horizontal. The method includes spinning a third roller of a second draper belt assembly about a second central longitudinal axis. The second draper belt assembly includes a third roller, a fourth roller, and one or a plurality of draper belts looped around the third and fourth rollers. The third roller defines a second central longitudinal axis about which the third roller spins, and a second plane extending through the second central longitudinal axis and parallel or substantially parallel to horizontal. The method includes pivoting the first draper belt assembly relative to the second draper belt assembly. Pivoting of the first draper belt assembly resulting in a change in a distance between the first and third rollers.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed draper belt systems, reference is made to the accompanying figures, wherein.

DETAILED DESCRIPTION

It should be understood that the relative terminology used herein, such as "front", "rear", "left", "top", "bottom", "vertical", "horizontal", "up" and "down" is solely for the purposes of clarity and designation and is not intended to limit embodiments to a particular position and/or orientation. Accordingly, such relative terminology should not be construed to limit the scope of the present disclosure. In addition, it should be understood that the scope of the present disclosure is not limited to embodiments having specific dimensions. Thus, any dimensions provided herein are merely for an exemplary purpose and are not intended to limit the invention to embodiments having particular dimensions.

The term "belt" as used herein refers to a belt, chain, or other mode of conveying material. The term "horizontal" as used herein refers to a lateral plane of the harvester or harvester header oriented substantially parallel to the terrain on which the harvester travels during normal operation and/or orientation of the harvester.

Figure 4:
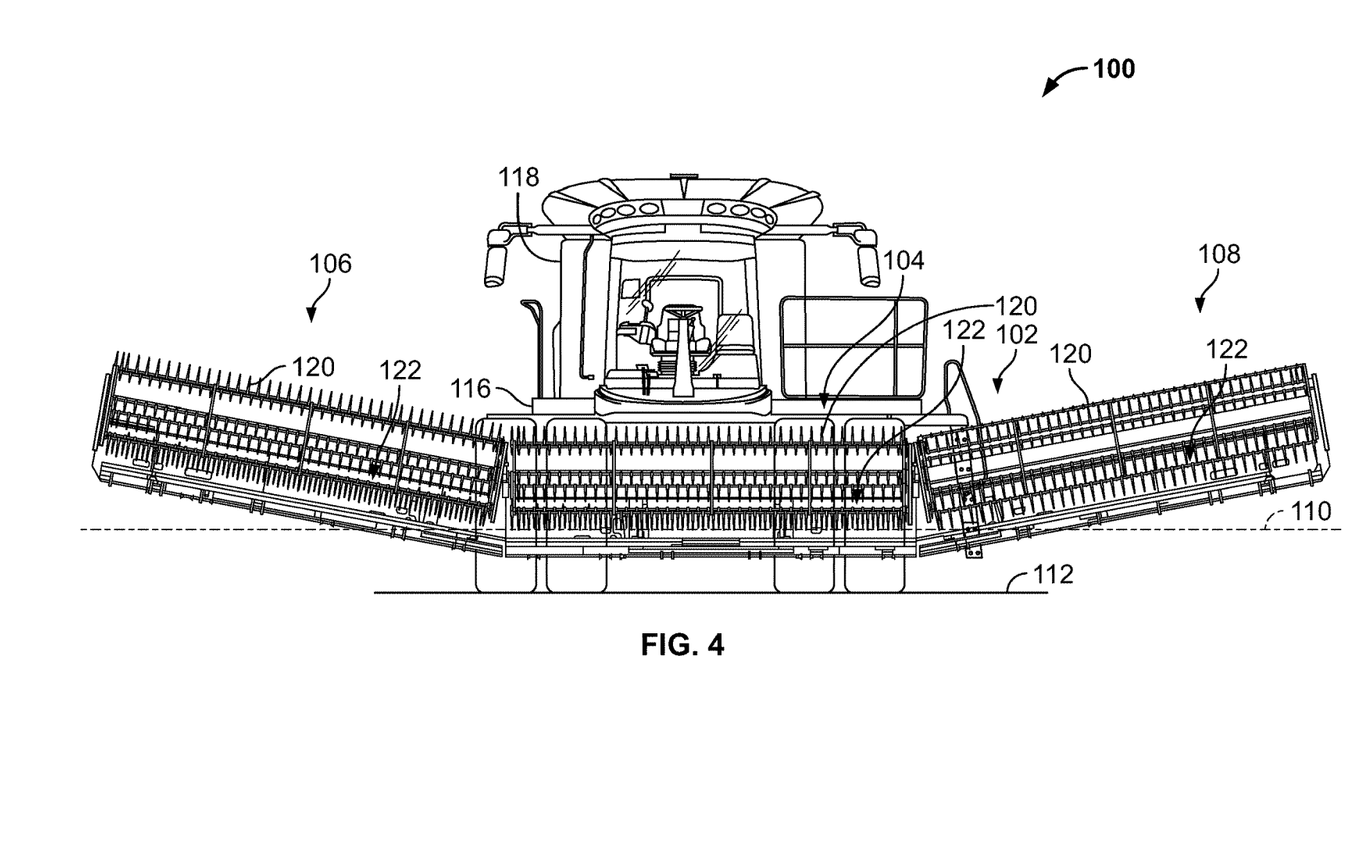
FIG. 4 is a front view of an exemplary harvester of the present disclosure including a header.

For example, FIG. 4 shows a front view of an exemplary harvester 100. The harvester 100 includes a header 102. The header 102 is in the form of a pivoting structure including a central section 104 (e.g., fixed frame) with right and left wings 106, 108 (e.g., pivot wings) capable of pivoting relative to the central section 104 to accommodate uneven terrain while providing the wide header 102 for greater crop capacity. A lateral plane 110 extends through the header 102 and can generally be substantially parallel to the ground 112 during normal use (e.g., defining horizontal as discussed herein). In some embodiments, the header 102 can include one or more augers disposed behind the central section 104 and the right and left wings 106, 108 to assist in guiding crop from the header 102 into a processing system 116 within the harvester 100 (e.g., below the cab 118). In some embodiments, only a draper belt system 122 can be used to guide crop from the header 102 into the processing system 116. The auger can rotate about a longitudinal axis extending substantially parallel to horizontal 110 when the right and left wings 104, 106 are in the unflexed or non-pivoted position. The central section 104 and the right and left wings 106, 108 can include reels 120. As will be discussed in greater detail below, the harvester 100 can further include a cutter bar configured to flex as the right and left wings 106, 108 pivot relative to the central section 104, and includes a knife guard and skid plate.

Figure 5:
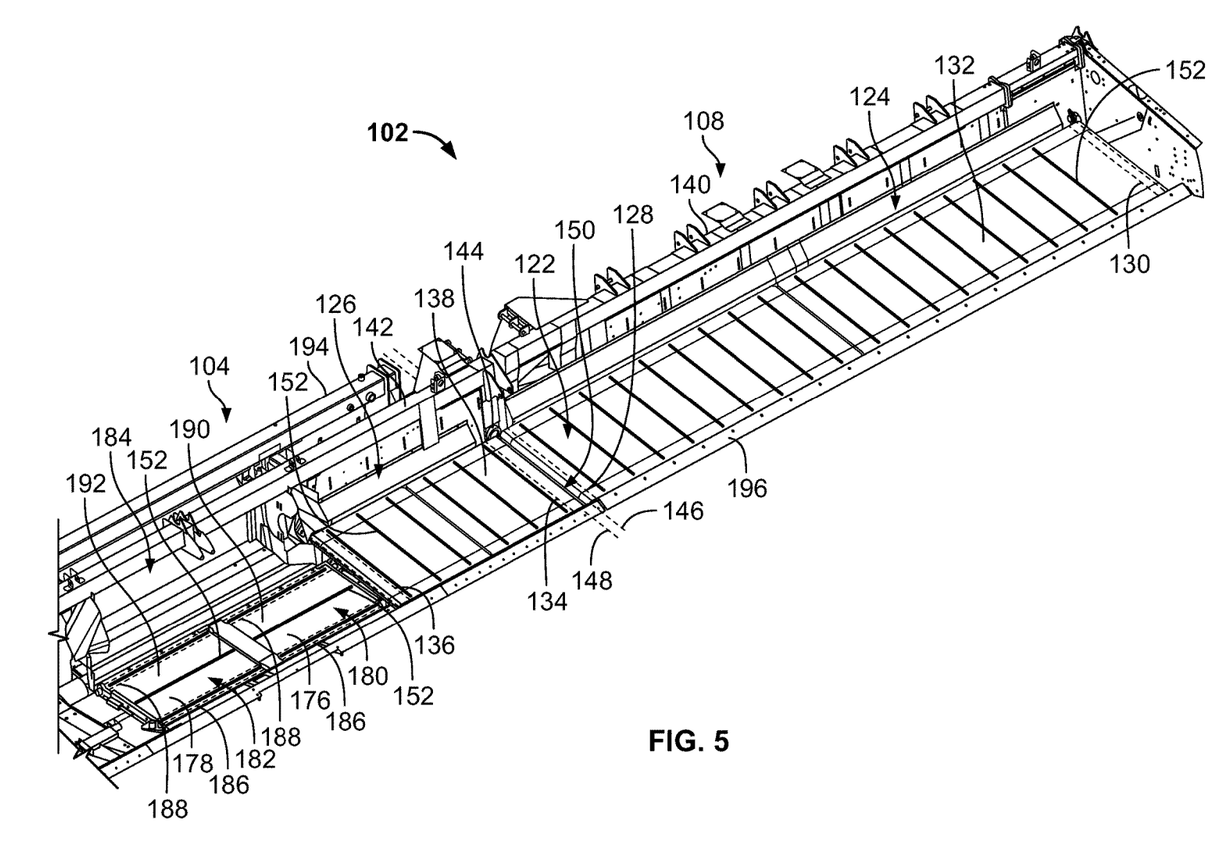
FIG. 5 is a perspective, partial view of an exemplary harvester header of the present disclosure.

FIG. 5 is a perspective view of a partial assembly of the header 102. Although discussed with respect to the left wing 108, it should be understood that the right wing 106 has a substantially similar structure and/or function. The header 102 includes a draper belt system 122 for transferring harvested crop from the left wing 108 to the central section 104 such that the central section 104 can introduce the crop into the processing system 116. The draper belt system 122 includes a first draper belt assembly 124 at the left wing 108 and a second draper belt assembly 126 at the central section 104 disposed adjacent to the first draper belt assembly 124.

The first draper belt assembly 124 includes a first roller 128, a second roller 130, and a belt 132 looped around the first and second rollers 128, 130. The first and second rollers 128, 130 can be of a substantially equal diameter. The second draper belt assembly 126 includes a third roller 134, a fourth roller 136, and a belt 138 looped around the third and fourth rollers 134, 136. The third and fourth rollers 134, 136 can be of a substantially equal diameter. In some embodiments, the first and second rollers 128, 130 can be of a substantially equal diameter as the third and fourth rollers 134, 136. The harvester 100 includes a drive system (not shown) configured to drive rotation of the rollers 128, 130, 134, 136 such that the belts 132, 138 can be rotated counterclockwise (from the viewpoint of FIG. 5). As the belt 132 is rotated in a counterclockwise direction, crop collected on the belt 132 is transferred from the left wing 108 to the belt 138 of the central section 104. The header 102 includes a draper frame 140 associated with the left wing 108 and a draper frame 142 associated with the central section 104. The draper frames 140, 142 rotatably couple at a pivot joint 144 disposed between the draper frames 140, 142 such that the left wing 108 can pivot relative to the central section 104. In some embodiments, the pivot joint 144 can be located at a distal end of the header 102 (e.g., at an opposing end from the leading edge of the header 102).

The first roller 128 and third roller 134 each have their own central longitudinal axis 146, 148 about which the respective first and third rollers 128, 134 rotate. The central longitudinal axes 146, 148 are both laterally spaced from the central longitudinal axis 164 about which the pivot joint 144 rotates, all of which are substantially parallel. Due to the spacing between the axes 146, 148, a gap 150 is formed between the belts 132, 138, with the pivot joint 144 substantially aligned with the center point of the gap 150. In some embodiments, the draper belts 132, 138 can include one or more cleats 152 extending from an outer surface of the draper belts 132, 138 to reduce sliding of the crop. The gap 150 between the belts 132, 138 provides for clearance of the cleats 152 during rotation of the belts 132, 138 and provides clearance for the left wing 108 during the pivoting action.

After transfer of the harvested crop to the second draper belt assembly 126, the harvested crop can be transferred to one or more infeed drapers 176, 178 of the central section 104. For example, the infeed draper 176 can receive crop from the left wing 108 through the draper belt system 122, and the infeed draper 178 can receive crop from the right wing 106 through a draper belt system substantially similar to the draper belt system 122.

Each infeed draper 176, 178 forms a central draper belt assembly 180, 182 that transfers the crop into the infeed section 184 for further processing. Each central draper belt assembly 180, 182 includes at least a pair of rollers 186, 188 with one or a plurality of draper belts 190, 192 looped around the rollers 186, 188. The draper belts 190, 192 can be rotated in a second direction that is different from the first direction of the draper belts 132, 138. In one embodiment, the draper belts 190, 192 can spin in a substantially perpendicular direction relative to the draper belts 132, 138. In one embodiment, the draper belts 190, 192 can spin at an angle (e.g., between about 40° and about 85°) relative to the draper belts 132, 138.

In some embodiments, the draper belts 190, 192 can include one or more cleats 152 extending from an outer surface of the draper belts 190, 192 to reduce sliding of the crop. The central section 102 can include an adaptor bar 194 configured and dimensioned to be detachably coupled to a complementary receiving section of the harvester or combine 100. A z-channel 196 can be coupled at or near the proximal end of the header 102.

Figure 6:
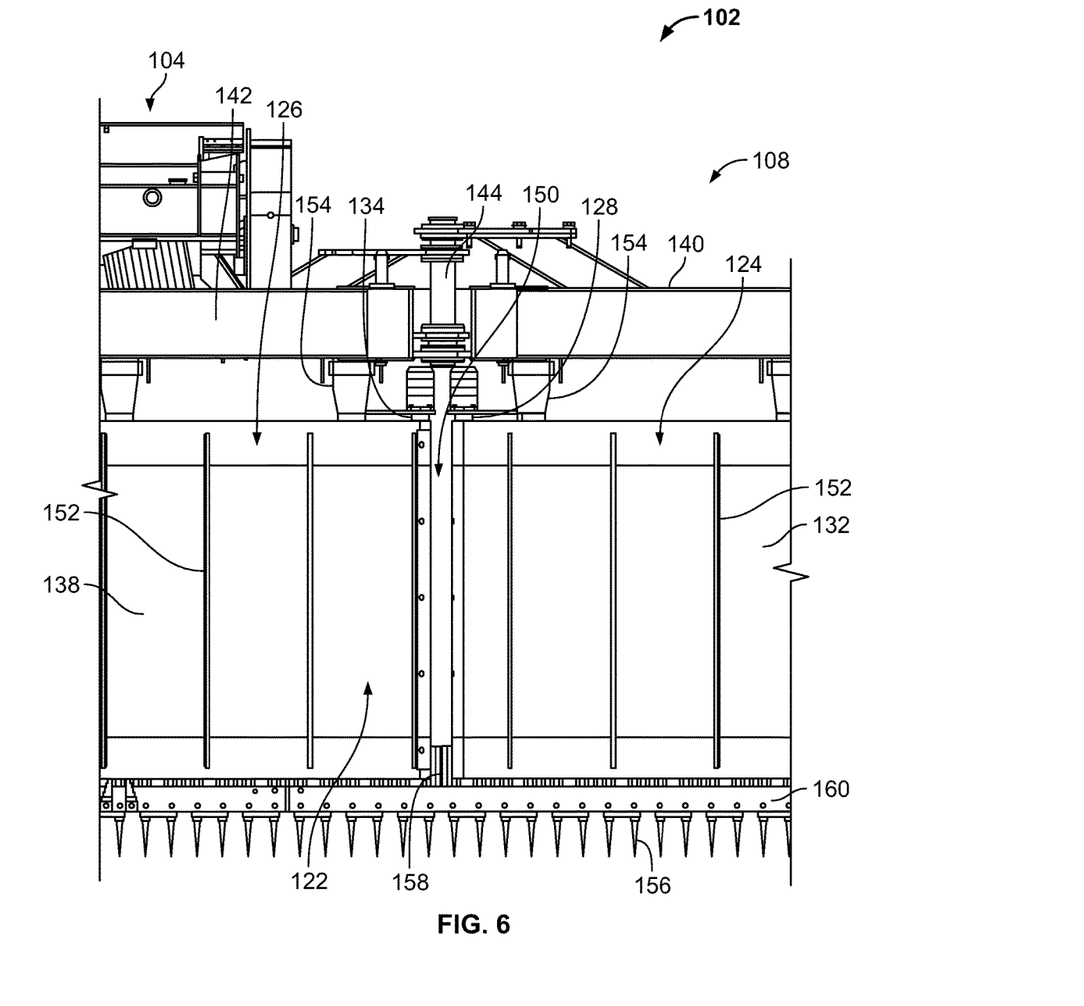
FIG. 6 is a top view of an exemplary draper belt system of the present disclosure including a wing draper belt section and a fixed draper belt section.
Figure 7:
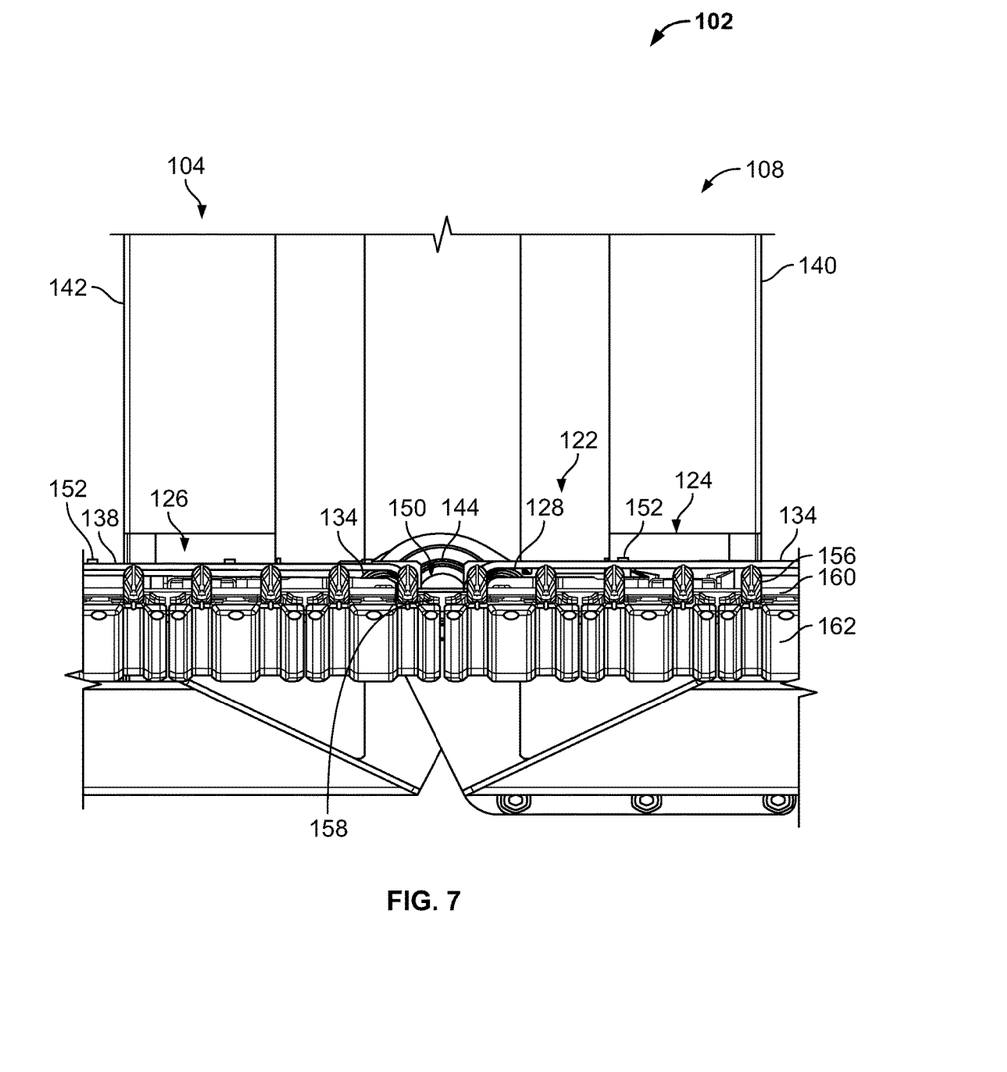
FIG. 7 is a front view of an exemplary draper belt system of the present disclosure including a wing draper belt section and a fixed draper belt section.

FIGS. 6 and 7 are top and front views of the header 102, particularly the area associated with the first draper belt assembly 124, the second draper belt assembly 126, and the pivot joint 144. The header 102 includes structures 154 that connect the rollers 128, 134 to the respective draper frames 140, 142. The header 102 includes a cutter bar 156 disposed in front of the first and second draper belt assemblies 124, 126 and extending substantially the entire width of the header 102. The track 158 associated with the cutter bar 156 allows for flexibility in the cutter bar 156 during pivoting of the left wing 108 relative to the central section 104. The cutter bar 156 can include a knife guard 160 extending along the width of the cutter bar 156. As shown in FIG. 7, the header 102 can include a skid plate 162 disposed below the cutter bar 156 and/or the first and second draper belt assemblies 124, 126 to allow for smoother travel of the header 102 over terrain.

Figure 8:
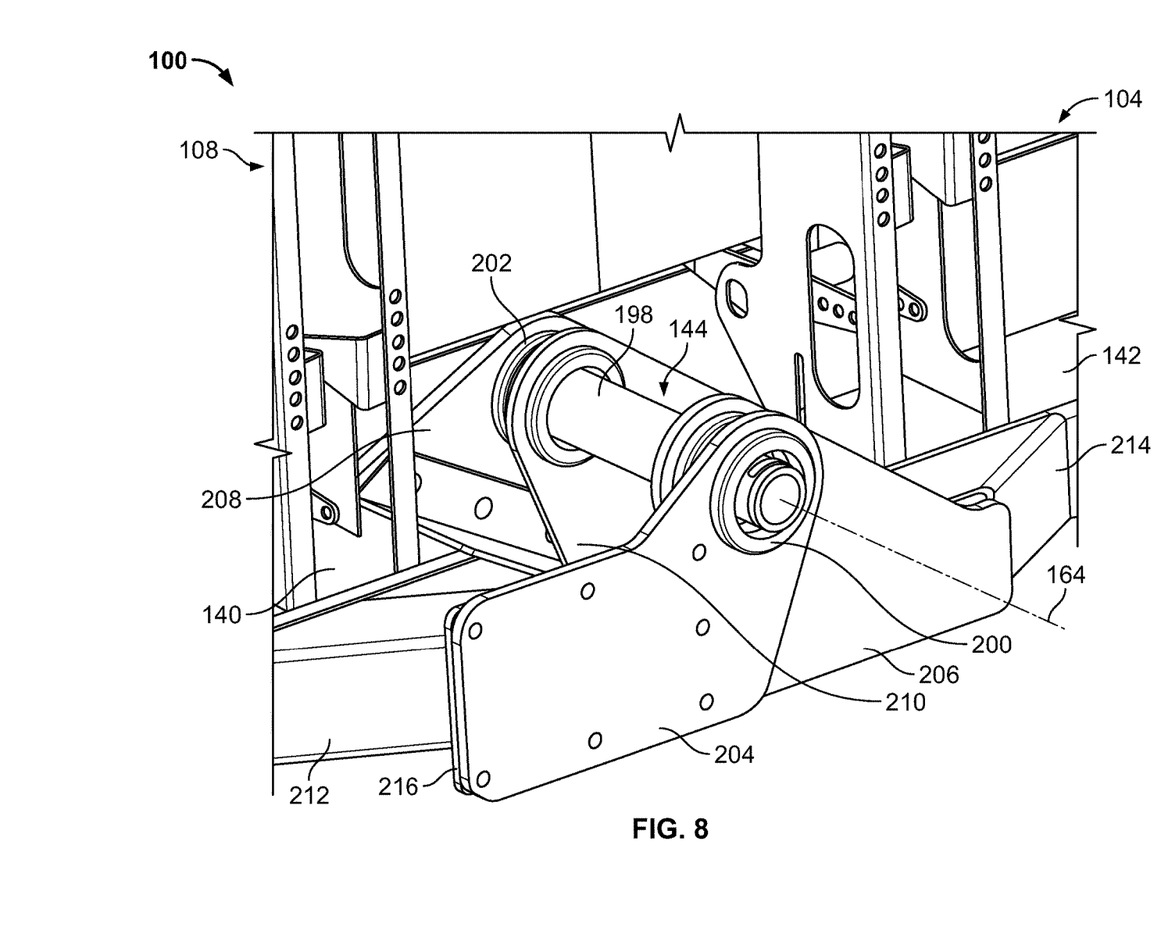
FIG. 8 is a rear perspective view of an exemplary draper belt system of the present disclosure including a pivot joint.

FIG. 8 is a rear perspective view of the harvester or combine 100 and, particularly, shows the configuration of the pivot joint 144. The pivot joint 144 generally includes a thick-walled piece of tubing 198 having a central longitudinal pivot axis 164 defining the axis of rotation for the pivot joint 144. The central longitudinal pivot axis 154 can also define the axis about which the left wing 108 pivots relative to the central section 104. The tubing 198 can serve as the pin for the pivot joint 144. The pivot joint 144 includes two self-lubricating bushings 200, 202 positioned over the opposing endpoints of the tubing 198 such that the tubing 198 can rotate within the respective bushings 200, 202 during pivoting of the left wing 108 relative to the central section 104.

The pivot joint 144 includes hinge or mounting plates 204-210 that couple the bushings 200, 202 to the left wing 108 and central section 104. In particular, the plates 204 can couple the bushing 200 to the draper frame 140 of the left wing 108, and the plate 206 can couple the bushing 200 to the draper frame 142 of the central section 104. Similarly, the plate 208 can couple the bushing 202 to the draper frame 140 of the left wing 108, and the plate 210 can couple the bushing 202 to the draper frame 142 of the central section 104. In some embodiments, the plates 204-210 can be fixedly coupled directly to the respective draper frames 140, 142.

In some embodiments, the plates 204, 206 can be fixedly coupled to extensions 212, 214 protruding from the rear of the respective draper frames 140, 142, resulting in the pivot joint 144 extending beyond a plane defined by the rear of the draper frames 140, 142 (see, e.g., FIG. 6). Extension of the pivot joint 144 beyond the plane defined by the draper frames 140, 142 allows for the pin or tubing 198 to be installed and/or removed from the rear of the header 102, thereby simplifying maintenance of the header 102. In some embodiments, each of the plates 204-210 can be fabricated from a heavy duty steel material, and can define a substantially planar or flat shape. In some embodiments, the plates 204-210 can each define a substantially L-shaped configuration ensuring a wide mounting of the plates 204-210 to the respective draper frames 140, 142. Wide mounting of the plates 204-210 reduces or prevents excessive fore-aft rocking of the left wing 108 about the bearing surfaces of the bushing 200, 202.

In some embodiments, the plates 204-210 can be coupled to the respective draper frames 140, 142 by welding. In some embodiments, the plate 204 can be bolted to a flange 216 of the extension 212 of the left wing 108 using fasteners. Such bolted joint can compensate for tolerances in the weld assemblies of the other plates 206-210. The coupling of the plates 204-210 to the bushings 200, 202 can alternate to ensure secure positioning of the bushings 200, 202. In particular, the plate 204 mounted to the left wing 108 can couple to one end of the bushing 200, and the plate 206 mounted to the central section 104 can couple to the opposing end of the bushing 200. The plate 208 mounted to the left wing 108 can couple to one end of the bushing 202, and the plate 210 mounted to the central section 104 can couple to the opposing end of the bushing 202. Thus, each bushing 200, 202 is mounted to the left wing 108 and the central section 104. In some embodiments, the plates 206, 210 mounted to the central section 104 can be disposed or sandwiched between the plates 204, 208 mounted to the left wing 108, as shown in FIG. 8, thereby preventing the left wing 108 from moving fore or aft along the axis 164.

Figure 9:
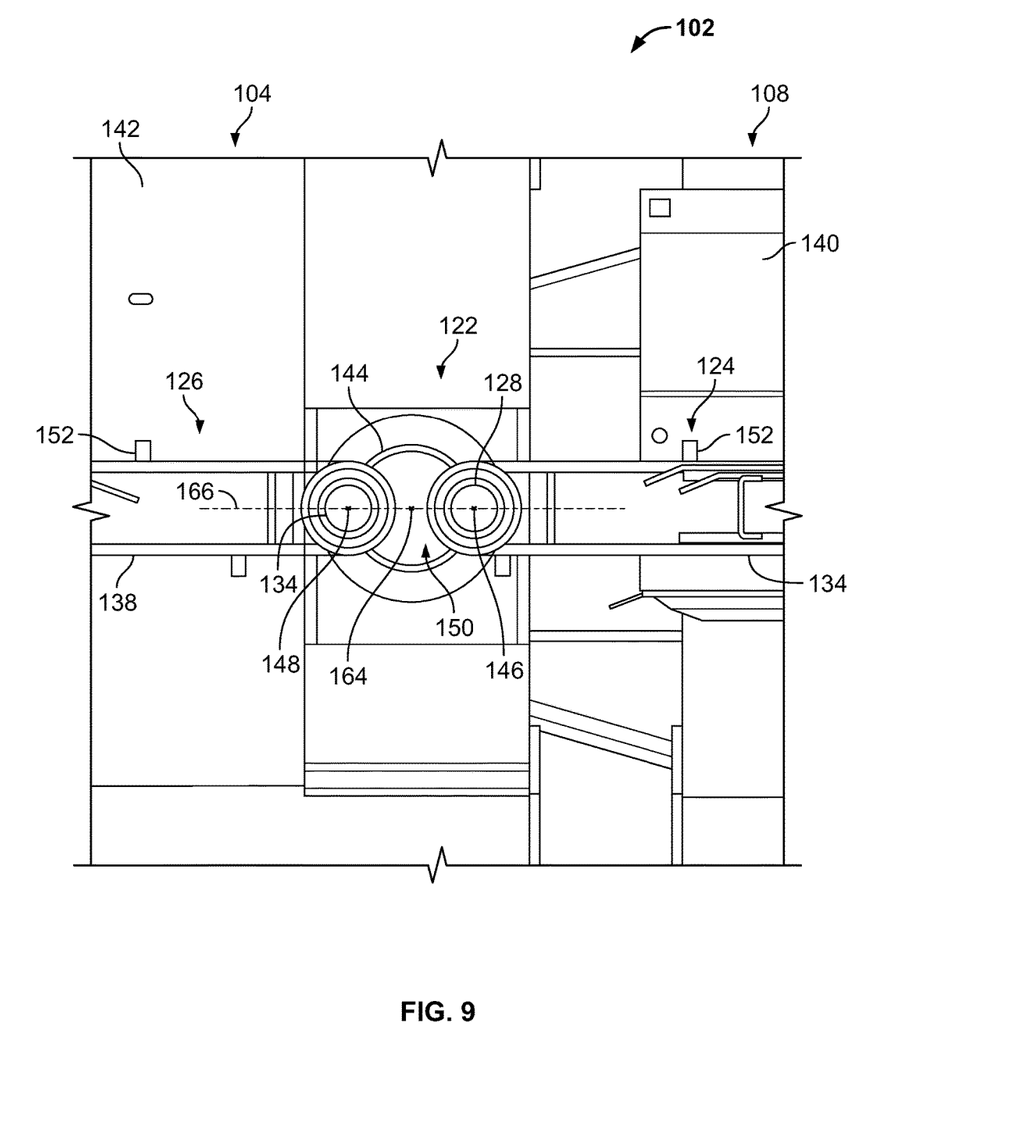
FIG. 9 is a detailed, front view of an exemplary draper belt system of the present disclosure including a wing draper belt section and a fixed draper belt section.

FIG. 9 shows a front view of a partial header 102, particularly the area associated with the first draper belt assembly 124, the second draper belt assembly 126, and the pivot joint 144. The cutter bar 156 and skid plate 162 have been removed for clarity. As noted above, the pivot joint 144 defines a central longitudinal pivot axis 164 of rotation for pivoting of the left wing 108 relative to the central section 104. In some embodiments, the axes 146, 148, 164 can be substantially aligned along the same plane 166. The plane 166 can be substantially parallel to horizontal 110. In some embodiments, the axes 146, 148 can be aligned along the plane 166 and the axis 164 can be vertically offset from the plane 166.

Figure 10:
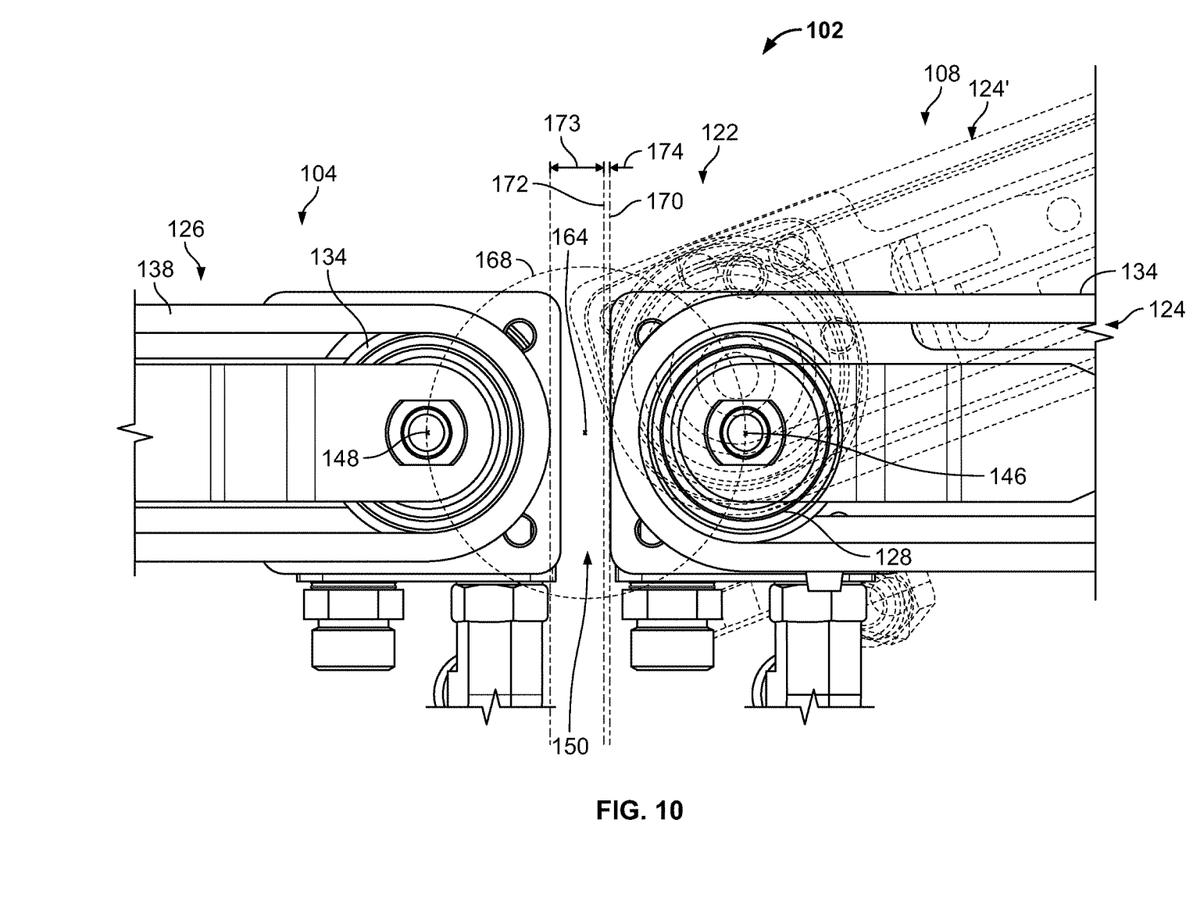
FIG. 10 is a detailed, front view of an exemplary draper belt system of the present disclosure including a wing draper belt section and a fixed draper belt section.

FIG. 10 shows a detailed front view of a partial header 102, with the first draper belt assembly 124 in-line with the second draper belt assembly 126, and the first draper belt assembly 124 pivoted upwards from horizontal 110 relative to the second draper belt assembly 126 (as represented by reference numeral 124'). Although shown as pivoted upwards from horizontal 110, it should be understood that the first draper belt assembly 124 can be pivoted incrementally upwards or downwards from horizontal 110 by an angle in the range of about 0 degrees (for a flat configuration) to about ±45 degrees.

The dashed circle of FIG. 10 represents the radial travel path 168 of the first roller 128 as the first draper belt assembly 124 pivots relative to the second draper belt assembly 126. In particular, the central longitudinal axis 146 of the first roller 128 travels along the radial path 168 when the first draper belt assembly 124 is pivoted by any angle from horizontal 110. In some embodiments, the central longitudinal axis 164 of the pivot joint 144 can be substantially aligned with the center point of the path 168.

Position 170 represents the point of the surface of the first roller 128 in the non-pivoted configuration (e.g., substantially parallel to horizontal 110) closest to the surface of the third roller 134. Position 172 represents the point of the surface of the first roller 128 closest to the surface of the third roller 134, when the first roller 128 is in the slightly pivoted configuration as represented by 124'. The difference between the positions 170, 172 is reflected as a change in a horizontal distance 174 that, in turn, represents a change in the distance 173 between the first and third rollers 128, 134. It should be understood that the distance 174 increases or decreases depending on the angle of pivoting of the first draper belt assembly 124. The distance 174 can be substantially zero when the first draper belt assembly 124 is substantially aligned with the second draper belt assembly 126 (e.g., substantially parallel to horizontal 110).

Thus, as the first draper belt assembly 124 pivots relative to the second draper belt assembly 126, the distance between the first and third rollers 128, 134 does not stay constant and instead changes by the distance 174. In particular, any pivoting of the first draper belt assembly 124 away from alignment with horizontal 110 results in a reduction in the distance between the first and third rollers 128, 134 by the distance 174. Such variation in distance 174 advantageously allow the cutter bar 156 to bend while reducing significant changes in tension and/or compression of the cutter bar 156 as the first draper belt assembly 124 is pivoted. Additionally, by not providing a frame that holds the distance between the rollers 128, 134 constant relative to one another, a costly component is not needed, construction of the system 100 is simplified, and maintenance time and of parts can be decreased.

Figure 11:
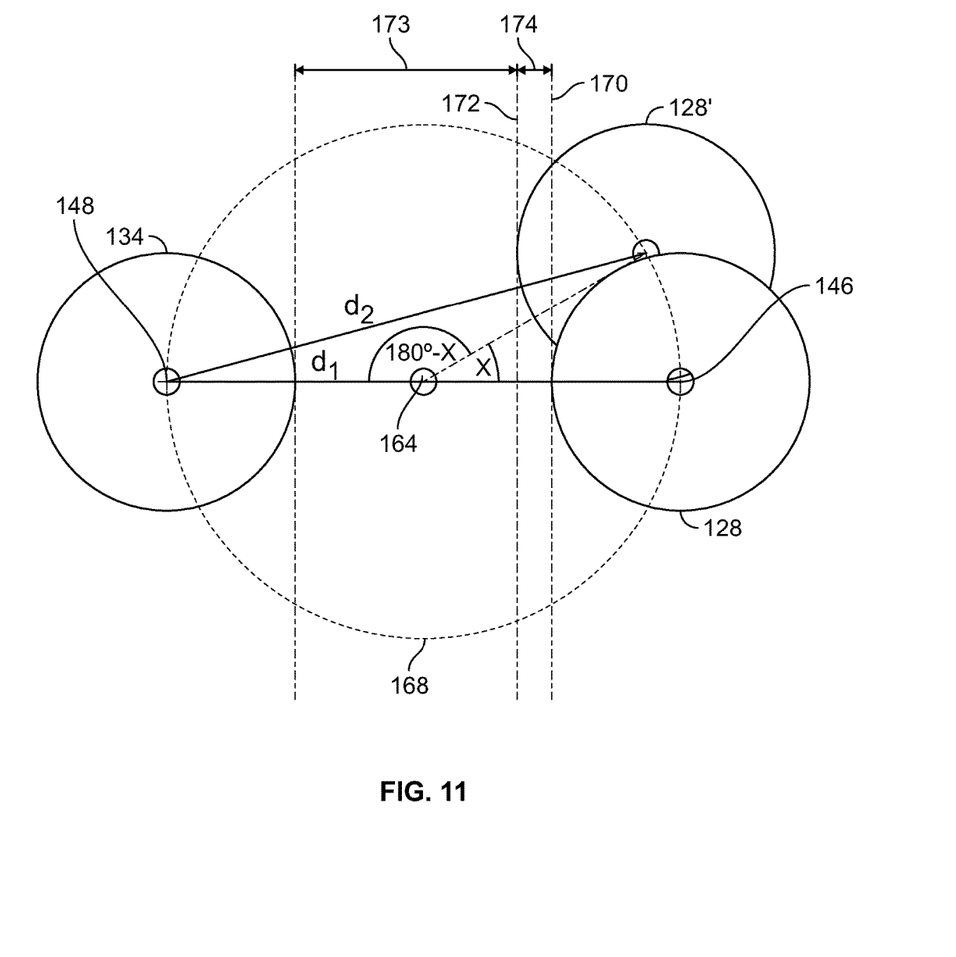
FIG. 11 is a diagrammatic view of an exemplary draper belt system of the present disclosure including a fixed roller and a pivoting wing roller.

FIG. 11 is a diagrammatic representation of the change in the distance 173 between the rollers 128, 134 as the first draper belt assembly 124 is pivoted relative to horizontal 110. Roller 128' represents the first roller 128 pivoted in upwardly along the radial path 168. The change in the lateral distance 174 between the first roller 128 aligned with horizontal 110 and the first roller 128' pivoted upwardly can be represented by the equation $d_2=d_1*\sin((180°-x)/2)$, where $d_1$ represents the distance between the axes 146, 148 of the rollers 128, 134 with no wing (e.g., first draper belt assembly 124) pivot, $d_2$ represents the distance between the axes 146, 148 of the rollers 128, 134 after pivoting of the wing by an angle x from horizontal 110, x represents the pivot angle of the wing relative to horizontal 110 in degrees, and 180°-x represents the subtended angle of $d_2$. Based on this equation, when the angle x is greater than zero (whether a positive angle or a negative angle), the distance $d_1$ is greater than the distance $d_2$. This relationship emphasizes the change in the distance 173 between the rollers 128, 134 during pivoting of the first draper belt assembly 124.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. A draper belt system, comprising:
    a first draper belt assembly comprising a first roller, a second roller, and one or a plurality of draper belts looped around the first and second rollers, the first roller defining a first central longitudinal axis about which the first roller spins, and a first plane extending through the first central longitudinal axis and parallel or substantially parallel to horizontal;
    a second draper belt assembly comprising a third roller, a fourth roller, and one or a plurality of draper belts looped around the third and fourth rollers, the third roller defining a second central longitudinal axis about which the third roller spins, and a second plane extending through the second central longitudinal axis and parallel or substantially parallel to horizontal;
    a first plate attached to the first draper belt assembly;
    a second plate attached to the second draper belt assembly; and
    a pin extending between the first and second plates, thereby defining a pivot axis of the first draper belt assembly relative to the second draper belt assembly;
    wherein the third roller of the second draper belt assembly is disposed adjacent to or substantially adjacent to the first roller of the first draper belt assembly with the first plane aligned or substantially aligned with the second plane; and
    wherein pivoting of the first draper belt assembly results in a change in a distance between the first and third rollers.

2. The draper belt system of claim 1, wherein pivoting of the first draper belt assembly results in a change in a distance between the first and second central longitudinal axes.

3. The draper belt system of claim 1, wherein the first and third rollers are of an equal diameter.

4. The draper belt system of claim 1, wherein the first central longitudinal axis extends parallel or substantially parallel to the second central longitudinal axis.

5. The draper belt system of claim 1, wherein the second draper belt assembly defines a fixed draper belt section of a harvester and the first draper belt assembly defines a pivoting wing draper belt section of the harvester.

6. The draper belt system of claim 1, wherein the pivot axis extends parallel or substantially parallel to the first and second central longitudinal axes.

7. The draper belt system of claim 1, wherein the pivot axis extends through the first and second planes.

8. The draper belt system of claim 1, comprising a wing frame coupled to a distal end of the first draper belt assembly, and comprising a central frame coupled to a distal end of the second draper belt assembly.

9. The draper belt system of claim 1, further comprises:
    a third plate positioned in spaced apart relation relative to the first plate, and attached to the first draper belt assembly, and
    a fourth plate positioned in spaced apart relation relative to the second plate, and attached to the second draper belt assembly,
    wherein the pin extends between the first, second, third and fourth plates, thereby defining a pivot axis of the first draper belt assembly relative to the second draper belt assembly.

10. A harvester header, comprising:
    a first draper belt assembly comprising a first roller, a second roller, and one or a plurality of draper belts looped around the first and second rollers, the first roller defining a first central longitudinal axis about which the first roller spins, and a first plane extending through the first central longitudinal axis and parallel or substantially parallel to horizontal;
    a second draper belt assembly comprising a third roller, a fourth roller, and one or a plurality of draper belts looped around the third and fourth rollers, the third roller defining a second central longitudinal axis about which the third roller spins, and a second plane extending through the second central longitudinal axis and parallel or substantially parallel to horizontal;

a first plate attached to the first draper belt assembly;

a second plate attached to the second draper belt assembly;

a pin extending between the first and second plates, thereby defining a pivot axis of the first draper belt assembly relative to the second draper belt assembly; and a central draper belt assembly comprising a fifth roller, a sixth roller, and one or a plurality of belts looped around the fifth and sixth rollers;

wherein the third roller of the second draper belt assembly is disposed adjacent to or substantially adjacent to the first roller of the first draper belt assembly with the first plane aligned or substantially aligned with the second plane; and wherein pivoting of the first draper belt assembly results in a change in a distance between the first and third rollers.

11. The harvester header of claim 10, wherein the first draper belt assembly spins the one or plurality of belts on the first draper belt assembly in a first direction, the second draper belt assembly spins the one or plurality of belts in the first direction, and the central draper belt assembly spins the one or plurality of belts in a second direction different from the first direction.

12. The harvester header of claim 11, wherein the second direction is substantially perpendicular to the first direction.

13. The harvester header of claim 11, wherein the second direction is at an angle relative to the first direction.

14. The harvester header of claim 13, wherein the angle is between about 40° and about 85°.

15. The harvester header of claim 10, wherein the central draper belt assembly defines an infeed draper.

16. The harvester of claim 10, wherein the header further comprises:

a third plate positioned in spaced apart relation relative to the first plate, and attached to the first draper belt assembly, and a fourth plate positioned in spaced apart relation relative to the second plate, and attached to the second draper belt assembly, wherein the pin extends between the first, second, third and fourth plates, thereby defining a pivot axis of the first draper belt assembly relative to the second draper belt assembly.

17. A harvester, comprising:
a header comprising:
a first draper belt assembly comprising a first roller, a second roller, and one or a plurality of draper belts looped around the first and second rollers, the first roller defining a first central longitudinal axis about which the first roller spins, and a first plane extending through the first central longitudinal axis and parallel or substantially parallel to horizontal;

a second draper belt assembly comprising a third roller, a fourth roller, and one or a plurality of draper belts looped around the third and fourth rollers, the third roller defining a second central longitudinal axis about which the third roller spins, and a second plane extending through the second central longitudinal axis and parallel or substantially parallel to horizontal;

first and third plates positioned in spaced apart relation and attached to the first draper belt assembly;

second and fourth plates positioned in space apart relation and attached to the second draper belt assembly;

a pin extending between the first, second, third and fourth plates, thereby defining a pivot axis of the first draper belt assembly relative to the second draper belt assembly; and a central draper belt assembly comprising a fifth roller, a sixth roller, and one or a plurality of belts looped around the fifth and sixth rollers;

wherein the third roller of the second draper belt assembly is disposed adjacent to or substantially adjacent to the first roller of the first draper belt assembly with the first plane aligned or substantially aligned with the second plane; and wherein pivoting of the first draper belt assembly results in a change in a distance between the first and third rollers; and a processing system configured to process crop introduced into the processing system through the central draper belt assembly.

18. The harvester of claim 17, wherein the third central longitudinal axis is oriented substantially perpendicularly to the first and second central longitudinal axes.

19. The harvester of claim 17, wherein the first draper belt assembly spins the one or plurality of belts on the first draper belt assembly in a first direction, the second draper belt assembly spins the one or plurality of belts in the first direction, and the central draper belt assembly spins the one or plurality of belts in a second direction different from the first direction.

20. The harvester of claim 19, wherein the second direction is substantially perpendicular to the first direction.

* * * * *